United States Patent [19]

Brownlie et al.

[11] Patent Number: 4,984,982
[45] Date of Patent: Jan. 15, 1991

[54] RETRACTABLE ACCESS FLOORING MODULE

[75] Inventors: Alan W. Brownlie, Skaneateles, N.Y.; Jack W. Lawhead, Harrisburg, Pa.

[73] Assignee: AMP Incorporated, Harrisburg, Pa.

[21] Appl. No.: 387,560

[22] Filed: Jul. 28, 1989

[51] Int. Cl.$^5$ ............................................. H01R 13/46
[52] U.S. Cl. ....................................... 439/131; 174/48; 174/53; 292/67; 292/DIG. 31; 439/501
[58] Field of Search ................... 439/131, 501; 174/48, 174/53, 57; 220/3.3, 3.5, 3.6, 3.7, 3.8; 312/22, 26, 30, 223; 292/67, DIG. 31

[56] References Cited

U.S. PATENT DOCUMENTS

| | | | |
|---|---|---|---|
| 1,860,913 | 5/1932 | Wagenhorst | 312/21 |
| 2,160,713 | 5/1939 | Bentley | 174/53 |
| 2,811,157 | 6/1953 | Guerrero | 174/57 |
| 3,131,512 | 5/1964 | MacLeod, Jr. | 50/127 |
| 3,250,558 | 5/1966 | McClintock | 292/DIG. 31 |
| 3,433,886 | 5/1966 | Myers | 174/57 |
| 3,526,703 | 9/1970 | Tucker | 174/53 |
| 3,587,906 | 6/1971 | Pepe | 174/53 |
| 3,622,684 | 11/1971 | Press | 174/48 |
| 3,646,244 | 2/1972 | Cole | 174/57 |
| 3,794,956 | 2/1974 | Dubreuil | 439/131 |
| 3,972,579 | 8/1976 | Kohaut | 439/131 |
| 3,992,070 | 11/1976 | Dunn | 312/22 |
| 4,372,629 | 2/1983 | Propst et al. | 312/223 |
| 4,511,198 | 4/1985 | Mitchell et al. | 439/131 |
| 4,551,577 | 11/1985 | Byrne | 174/57 |
| 4,747,788 | 5/1988 | Byrne | 439/131 |

Primary Examiner—Neil Abrams
Attorney, Agent, or Firm—Bruce J. Wolstoncroft

[57] ABSTRACT

An access flooring module, which makes available the power and signal cable to a user, is configured to be easily adaptable and user friendly. The module has a movable dividing wall provided therein, the dividing wall being positioned between the power and the signal transmissions to insure the reliability thereof. A pivot arm is provided which allows the module to move between a first position and a second position. A deformable member is positioned on the module, such that as the module is moved between the first and the second positions, the deformable member controls the movement of the module. A latch member is provided on the module, the latch member being moveable between an open position and a closed position. The latch member is provided to secure the access flooring module in the first position, and to provide an opening through which electrical cords can pass.

23 Claims, 6 Drawing Sheets

RETRACTABLE ACCESS FLOORING MODULE

FIELD OF THE INVENTION

The invention is directed to an access flooring module in which electrical power and signal cables are made available to the user. In particular, the access flooring module is configured to be easily adaptable and easy to operate.

BACKGROUND OF THE INVENTION

As the use of modular offices increases, it is essential that power and signal cables be delivered to these offices in a manner which will not interfere with the daily operations of the personal which occupy the offices. Consequently, the use of access flooring is becoming widespread.

Access flooring allows the power and signal cables to be placed beneath the floor in a position which will not interfere with the placement of walls or furniture. The use of access flooring also allows the power and signal cables to be moved as the modular offices are moved.

In order for the power and signal cables to be utilized, the cables are currently terminated in access flooring modules. These access flooring modules provided the end user or operator with the means to connect his office equipment to the power and signal cables required for the proper operation thereof.

There are many access flooring modules currently available in the market. However, the process flooring modules available have problems associated therewith, which make them difficult to use and service.

A typical access flooring module has a cover which is pivoted to an open position to reveal the various power and signal components which are terminated therein. The power and signal components remain in a constant position. This type of configuration is difficult for a typical office worker to use, as the plugs are positioned below the level of the floor. The configuration is also difficult for an installer/repairman. As the plugs need to be repaired or replaced, the positioning of the plugs in the floor is not a preferred position. Consequently, the office worker must assume an awkward position if a plug is to be inserted or removed from the access flooring module. A further difficulty associated with this type of flooring module resides in the fact that the office worker will be unable to properly view the termination of the plug to the socket. This is of particular concern if the access flooring module has many termination provided therein Consequently, the plug may be improperly inserted into the socket, resulting in an ineffective electrical connection between the plug and the socket.

One solution to this type of problem is shown in U.S. Pat. No. 3,972,579. The electrical insert device shown in the patent has pivot means which cause the electrical receptacle to be positioned in the same plane as the floor when the cover is moved to the open position. This allows the operator to more easily access the electrical receptacle, thereby reducing the possibility of mis-insertion of the plug into the receptacle.

While the above-referenced patent discloses an electrical insert device which is more user friendly than other modules, several problems are associated with the device. The device is difficult to access when it is in the closed position, as no easily accessible latch means are provided thereon. Consequently, there is no easy means to pivot the cover from the closed position to the open position. A second problem associated with the device, is that no means is provided to control the motion of the device when the device is moved between the open position and the closed position. In other words, if the user or operator does not maintain control of the cover as the device is closing, the uncontrolled movement of the device may cause damage to the wire or electrical components provided in the device, resulting in an ineffective electrical connection. This is particularly true if signal cables are provided in the device.

A third problem associated with the device disclosed in the patent relates to its inflexibility in adapting to various configurations. It is important in office settings that the access flooring modules be able to provide the power and signal terminations required. This includes the ability for the modules to accommodate the changing needs of the office, i.e. the inclusion or removal of either signal or power terminations as required. However, the device disclosed in the above-referenced patent is not configured to provide for the inclusion or removal of power or signal terminations. It is also worth noting that the problems discussed in relation to the patent are not exclusive to that device, but are present in the majority of access flooring modules currently available.

SUMMARY OF THE INVENTION

The object of the invention is to provide an electrical connector assembly for use in an access floor or the like. The assembly is modular in nature and more user friendly than the assembly known in the art.

An aspect of the invention is directed to an electrical assembly having electrical sockets provided therein. The electrical assembly has inner assembly which has a first sidewall, a second sidewall, and endwalls. An outer frame means, which has a front wall, is spaced from the first sidewall of the inner assembly. Pivot means are provided between the inner assembly and the outer frame means, the pivot means allow the inner assembly to move between a first position and a second position relative to the outer frame means. A deformable member is provided proximate to and integrally attached to the first sidewall of the inner assembly, whereby as the inner assembly is moved between the first and the second positions, the deformable member will engage the front wall of the outer assembly, causing the deformable member to frictionally engage the front wall in such a manner so as to insure that the motion of the inner assembly between the first and the second position will be done in a controlled manner which will not damage the electrical sockets provided in the assembly.

An alternative aspect of the invention is directed to a latch member which has frame means which has openings provided therein. The openings having an oblong configuration. Pivot means cooperate with the openings to allow the frame means to pivot about the pivot means. The pivot means are dimensioned to allow the frame means to move relative to the pivot means in a direction which is essentially perpendicular to the longitudinal axis of the pivot means. Resilient means are provided in engagement with the frame means, the resilient means providing the means to insure that the frame means is pivoted about the pivot means. Whereby as the frame means is moved in a direction which is essentially perpendicular to the longitudinal axis of the pivot means, the resilient means cooperates with the frame means to move the frame means between an open and a closed position.

An alternative aspect of the invention is directed to an electrical assembly having electrical sockets provided therein, as described above. The electrical assembly has a deformable member provided proximate to and integrally attached to the first sidewall of the inner assembly, whereby as the inner assembly is moved between the first and the second positions, the deformable member will engage the front wall of the outer assembly, causing the deformable member to frictionally engage the front wall in such a manner so as to insure that the motion of the inner assembly between the first and the second position will be done in a controlled manner which will not damage the electrical sockets provided in the assembly.

An alternative aspect of the invention is directed to an electrical assembly having electrical sockets provided therein, as described above. A plurality of slots are provided in the housing means, the slots extend from the top surface to the bottom surface. At least one dividing wall is positioned in respective slots, the respective slots cooperate with the walls to insure that each dividing wall is maintained in position relative to the housing means. Each dividing wall can be positioned in any respective slot, whereby as the electrical assembly is required to house power and signal sockets, the dividing wall can be positioned between the power and signal sockets, in the respective slot, to insure that the reliability of each socket will be insured, and as the requirements of the electrical assembly change, the dividing wall can be moved as required.

DETAILED DESCRIPTION OF THE INVENTION

Figure 1:
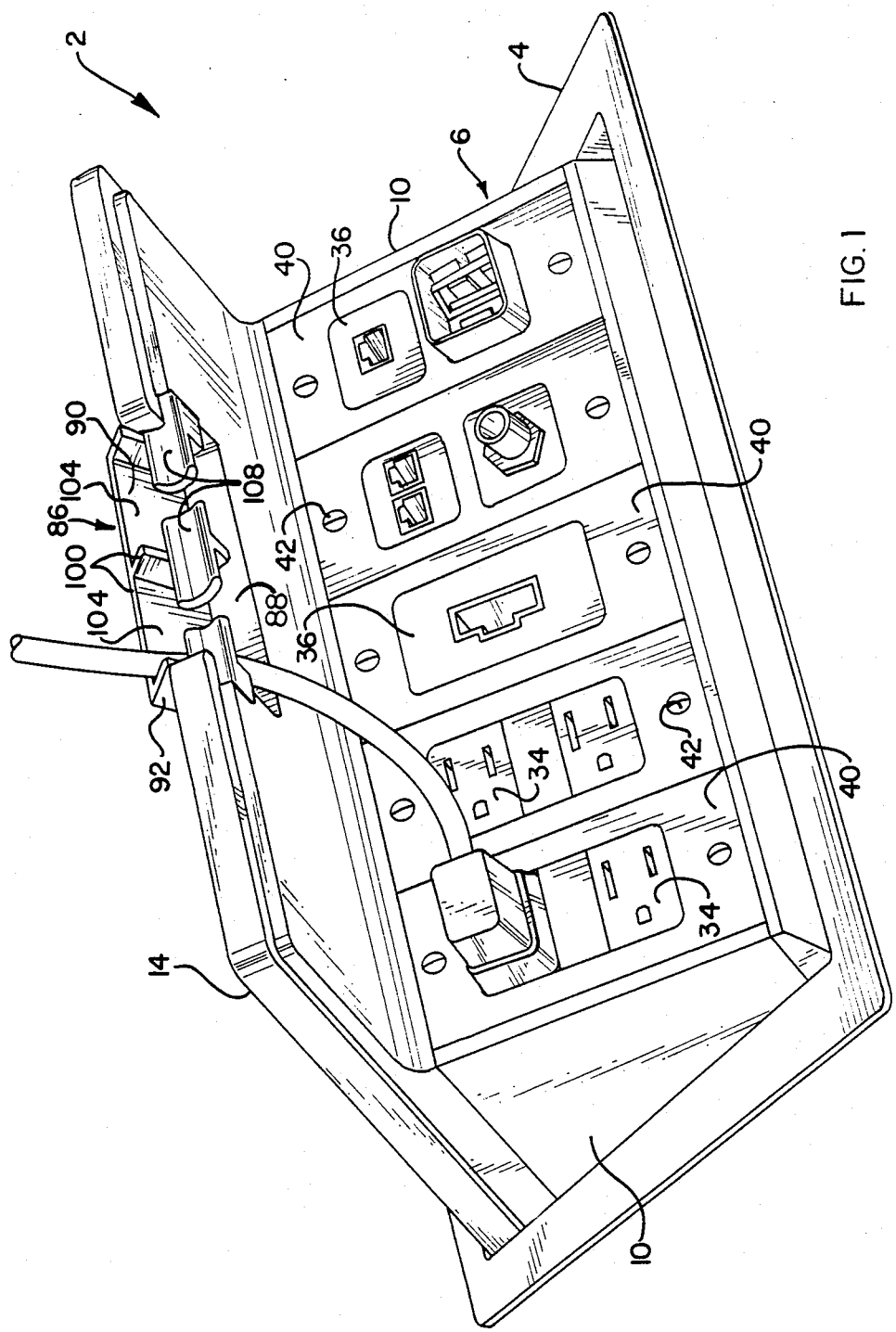
FIG. 1 is a perspective view of a access flooring module according to the present invention, the module is shown position in the open position.
Figure 2:
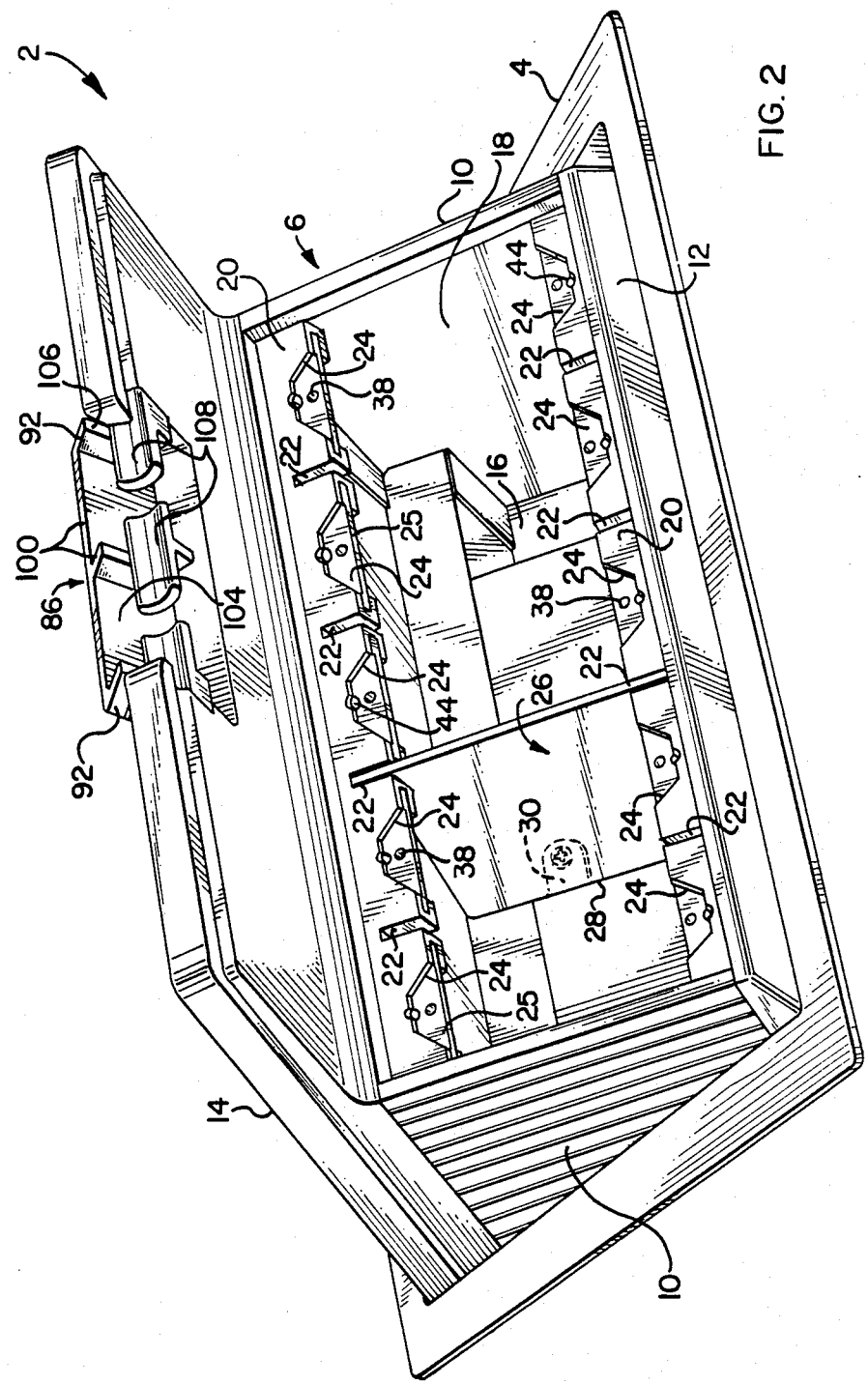
FIG. 2 is a perspective view of the module similar to that shown in FIG. 1, the module has the face plate and the electrical components removed to better show the inside structure of the module.
Figure 3:
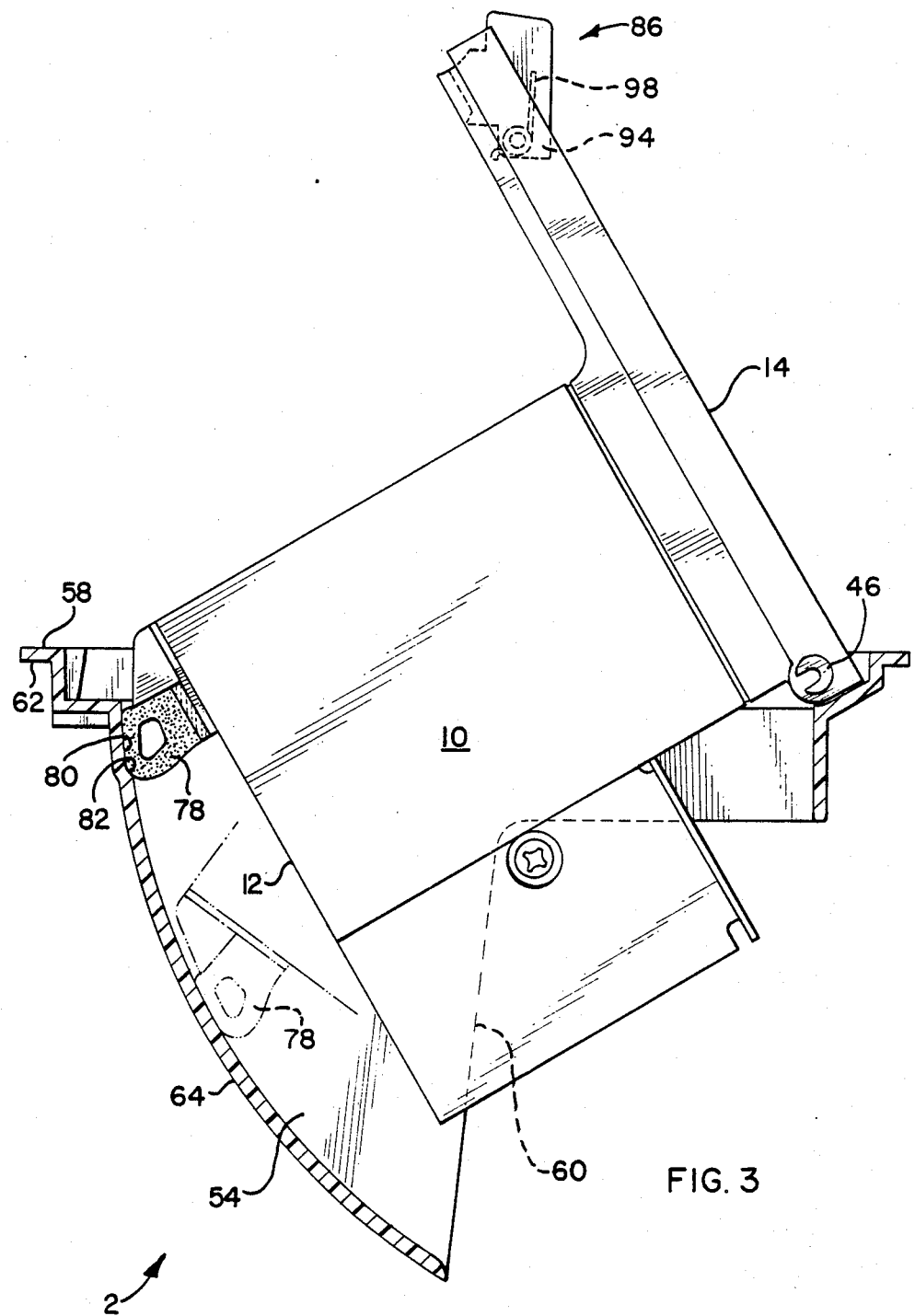
FIG. 3 is a cross-sectional view of the module provided in the access floor, the module is shown in the open position.
Figure 4:
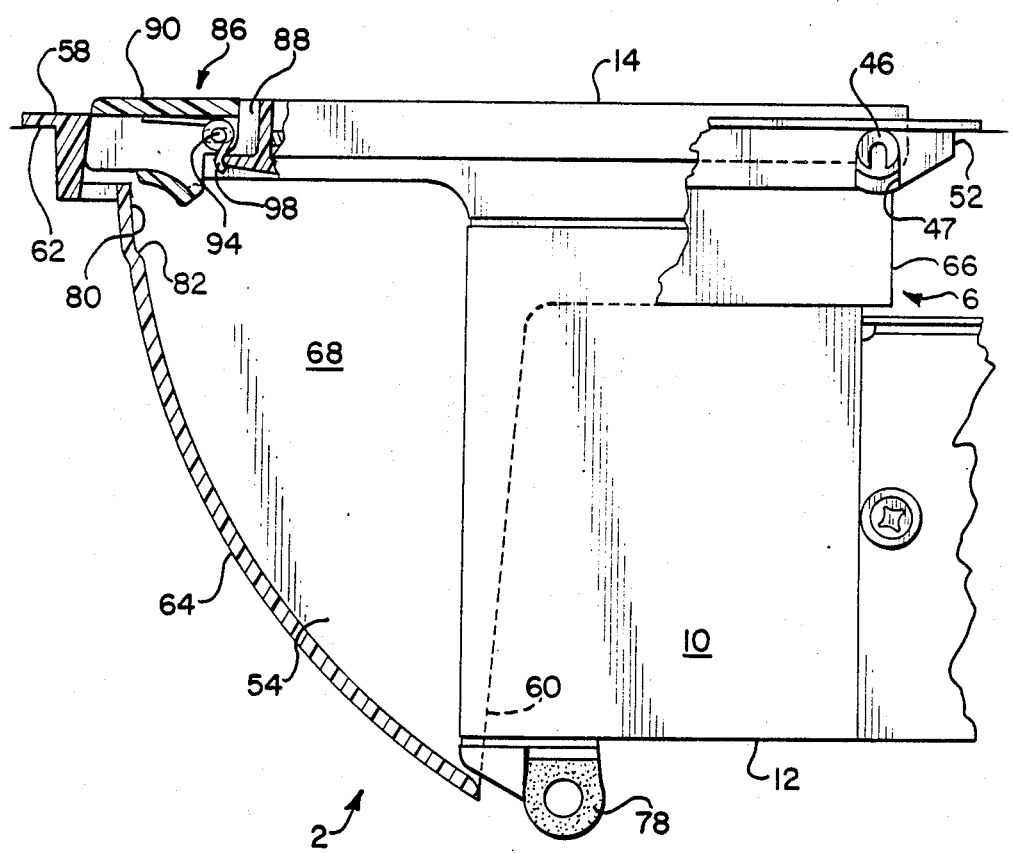
FIG. 4 is a cross-sectional view of the module provided in the access floor, the module is shown in the closed position.

As is best shown in FIGS. 1 through 4, access flooring module 2 is configured to be disposed in an opening 4 which is provided in an access floor or the like. The module 2 is movable relative to the floor between an open position, as shown in FIG. 3, and a closed position, as shown in FIG. 4.

Referring to FIG. 4, module 2 has an inner assembly 6 which has end walls 10, a sidewall 12, a cover plate 14, and a bottom wall 16 which cooperate to form a box-like structure which has an opening 18 (FIG. 2) into which the electrical components of the access flooring module are received.

Each sidewall 12, as shown in FIG. 2, has a face plate supporting projection 20 which extends therefrom. The face plate supporting projections 20 are positioned adjacent to the ends of the sidewalls 12 which are opposite the bottom wall 16. The projections 20 extend from the sidewalls 12 into opening 18 in a direction which is essentially parallel to the plane of the bottom wall 16. Each assembly 6 has two identical projections 20 which extend into opening 18 in opposed relationship to each other. As is best shown in FIG. 2, projections 20 have slots 22 and face plate receiving recesses 24 provided therein. Each respective slot 22 and recess 24 of the first projection 20 is provided in alignment with a corresponding slot 22 and recess 24 of the second projection 20. A plurality of metal plates 25 are provided in projections 20. As best shown in FIG. 2, the plates are separated from each other and encased by dielectric material.

Dividing wall 26 is provided in respective slots 22 of projections 20. The side edges of the wall 26 are positioned in the slots 22, thereby preventing wall 26 from movement relative to the endwalls 10 of the assembly. A leading edge 28 of dividing wall 26 has at least one securing projection 30 which extends therefrom. When the dividing wall is properly inserted into the assembly, the projection 30 is positioned adjacent to the bottom wall 16 and secured thereto. This insures that the dividing wall 26 will be maintained in the position required for operation. It should be noted that the plurality of slots 22 provided in the projections 20 allow the wall 26 to be positioned in various positions in the opening 18, as will be more fully discussed.

Recesses 24 are dimensioned to receive portions of the electrical components therein. The electrical components, i.e. power sockets 34 or signal sockets 36 (FIG. 1), are inserted into opening 18 such that mounting projections (not shown) of the electrical components are received in the recesses 24 of projections 20 and placed in electrical engagement with plates 25. The electrical components are then secured to the projections 20 by the use of screws or the like inserted into openings 38. The cooperation of the components with respective isolated plates 25 provides the insulation grounding required for the effective operation of the components. After the components have been secured to the plates 25 of projections 20, modular face plates 40, as shown in FIG. 1, are inserted over the electrical components. The face plates 40 are secured to the projections 20 by means of screws 42 which cooperate with openings 44 (FIG. 2).

In the embodiment shown in FIG. 1, the access flooring module 2 has five electrical components provided therein, two of the components are power sockets 34 and three are signal sockets 36. However, as the requirements of the module will vary, the embodiment shown in the drawings is meant to be viewed as an illustration of a typical embodiment.

With the use of access flooring modules, it is important that the power and signal transmissions be delivered to the same location. This arrangement minimizes the space required and simplifies the termination which the user must perform. However, as the current supplied by the power components 34 is significant, the reliability of the signal components 36 can be effected due to the close proximity to the power components. It is therefore important that the power and signal components be separated in order to insure for their effective operation. Consequently, the dividing wall 26 separates the power and signal components 34, 36.

In order for module 2 to be useable in a variety of situations, wall 26 must be movable between various slots. This allows any particular position in the modular assembly to be used for power or signal components as required. Therefore, the dividing wall 26 can be moved between any pair of electrical components 34, 36, in order to provide the shielding required. This modular aspect of the assembly is extremely beneficial. As the needs of an office are continually changing, it is vital for the modular assembly to meet the changing needs of the office. Therefore, as wall 26 is movable, the assembly 2 of the present invention can be modified as required. In other words, if an office requires more signal sockets and less power sockets, the wall 26 can be moved and the appropriate components installed. This eliminates the need to replace the entire assembly, resulting in a great cost savings.

In order to facilitate the movement of the assembly between the open and the closed positions (FIGS. 3 and 4), a pivot member 46 is provided. This pivot member cooperate with the cover plate 14 to insure that the box-like structure will pivot as desired. In order to facilitate this pivoting action, an arcuate surface 48 is provided on the cover plate 14, proximate pivot member 46. As the cover plate is moved between the open and the closed position, the arcuate surface 48 of the cover plate 14 is caused to cooperate with a shoulder 50 of rim 52, as best shown in FIGS. 3 and 4. The cooperation, or the sliding engagement, of surface 48 and shoulder 50 prevents the pivot member 46 from being damaged as a force is applied to the cover plate 14. In other words, if a force, which is directed downward in a direction which is essentially perpendicular to the axis of the pivot member 46, is applied to the cover plate 14 during the operation of the cover plate, the force will be transferred from the cover plate to the rim 52, due to the physical engagement of the surface 48 with the shoulder 50. As the rim and shoulder are made from relatively strong material, this force will not damage the assembly. If the surface and the shoulder were not provided the force applied to the cover plate 14 would be distributed to the relatively weak pivot member 46, which could result in the failure of the assembly.

In order to insure that the forces applied to the cover plate are transferred to the rim and shoulder, the pivot member is retained in slot 47. As shown in FIG. 4, slot 47 is configured to allow the pivot member 46 to move or "float" in the slot, in a direction which is essentially parallel to the longitudinal axis of the slot. Consequently, as the pivot member is not fixedly retained in the vertical direction (as viewed in FIG. 4), the application of a force to the cover plate 14 will cause the surface 48 of plate 14 to move against the shoulder 50 of rim 52. This provides the means required to transfer the force from the cover plate to the rim, without damaging the pivot member.

As shown in FIGS. 1 through 4, assembly 6 is positioned in a metal casing 54 which is positioned in the opening 4 of the floor. The metal casing 54 has an opening 56 for receipt of the assembly 6 therein. The opening 56 extends from a top surface 58 to a bottom surface 60 thereof. Provided proximate the top surface 58 is shoulder 62 which extends about the perimeter of the top surface 58. The shoulder 62 extends from sidewalls 64, 66 of the casing 54 in a direction which is essentially parallel to the top surface 58. The shoulder 62 cooperates with the floor to maintain the casing 54 and assembly 6 in position relative to the floor. A shroud is provided over the shoulder to provide an aesthetically pleasing appearance.

Sidewall 64 has an arcuate configuration, as will be more fully discussed. End walls 68 of casing have the slots 47 provided proximate top surface 58 thereof. As was previously discussed, the openings cooperate with pivot members 46 so that pivot members 46 allow assembly 6 to move relative to casing 54.

As best shown in FIGS. 3 and 4, sidewall 12 of assembly 6 has deformable member 78 attached thereto. The member 78 is made from rubber or some other material which is able to be deformed when a force is applied thereto and which will return to its original shape when the forces are retracted. As is shown in FIG. 4, when the assembly 6 is provided in the closed position, the deformable member 78 is not engaged. As the assembly 6 is moved to the open position, the member 78 engages the inside surface of arcuate sidewall 54 of casing 54, as is shown in phantom in FIG. 3. The engagement of member 78 with sidewall 64 provides a frictional force therebetween. This force is not of sufficient magnitude to prevent the movement of the assembly 6 between the open and the closed position. However, the engagement is sufficient to prevent the assembly 6 from being moved in such a manner so as to damage the electrical components 34, 36 provided in the assembly. As a force is applied to the assembly 6, to either open or close the assembly 6 relative to the casing 54, the member 78 will engage the sidewall 64 and provide a force which resists the movement of the assembly 2. The resistance force is not sufficient to prevent the movement, it is merely sufficient to insure that the movement of the assembly 6 will be done in a controlled manner.

When the assembly 6 is placed in the open position, as shown in FIG. 3, the member 78 is moved into a recess 80 provided on the inside surface of the sidewall 64. The positioning of the member 78 in the recess 80 provides a positive means to retain the assembly 6 in the open position. In this open position, the member 78 is provided in engagement with a shoulder 82 of the recess 80. The engagement between the shoulder 82 and member 78 prevents the assembly 6 from prematurely returning to the closed position. Consequently, the assembly 6 is maintained in the open position.

In order to return the assembly 6 from the open position to the closed position, a force is applied to the assembly 6. The force must be sufficient to move the member 78 beyond the shoulder 82 of the recess 80. Once the member 78 has been disengaged from the shoulder 82, the force applied to the assembly 6 can be decreased. In fact, after member 78 has been forced past the shoulder 82, the weight of the assembly 6 is sufficient to return the assembly 6 toward the closed position. The arcuate configuration of the sidewall 64 approximates the path which the member 78 follows upon return to the closed position. Therefore, once the assembly 6 is placed in motion, the weight of the assembly 6 is sufficient to maintain the motion of the assembly 6. It should be noted that the operator must apply a final force to the cover plate 14 of the assembly 6 to return the assembly 6 to the fully closed position.

Figure 9:
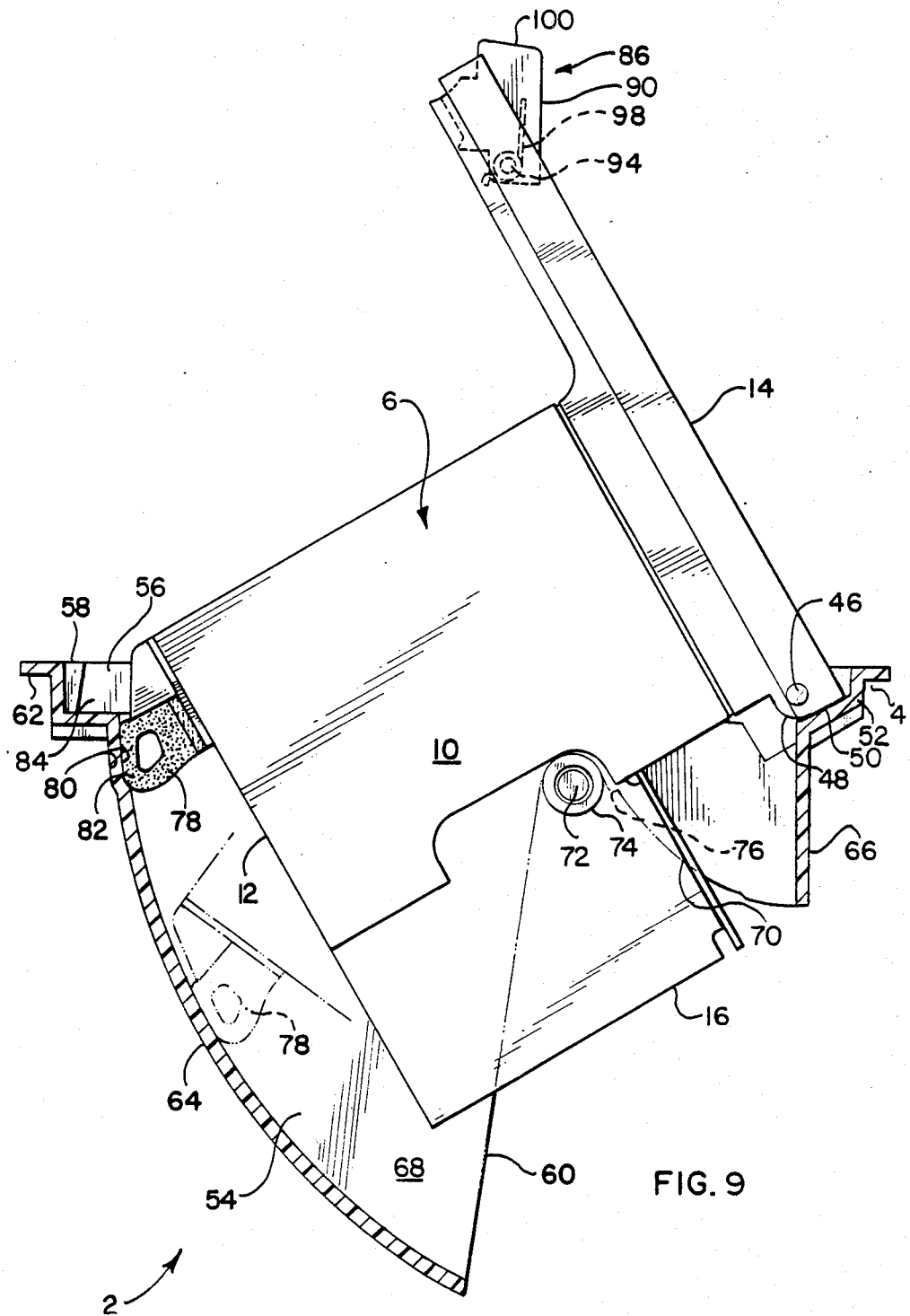
FIG. 9 is a cross-sectional view of an alternative embodiment of the invention, the module is shown in the open position, which is similar to FIG. 3.

An alternate embodiment is shown in FIG. 9. For ease of understanding and explanation, the same reference numerals will be used for identical parts in each embodiment. As shown in the Figure, an arcuate surface 70 is provided on the end walls 68. The arcuate surface 70 can either replace the need for the member 78 or provide a redundant means to regulate the movement of the assembly.

Arcuate surfaces 70 are provided on end walls 68, and extend from sidewall 66 toward sidewall 64. Surfaces 70 cooperate with projections 72 which extend from end walls 10 of assembly 6. The projections 72 are rounded and have smooth outer surfaces provided thereon. The projections 72 are positioned on end walls 10 so that the outside surfaces 74 engage the arcuate surfaces 70. Consequently, as assembly 6 is pivoted between the open and the closed positions, the projections 72 are slid along arcuate surfaces 70. This cooperation of the projections 72 with the arcuate surfaces 72 provides a means to distribute the forces applied to the assembly 6 when the assembly is moved between the first and second positions. As the projections and arcuate surfaces are of significant strength, the distribution of forces to these members will not cause damage to the module 2. This prevents the forces from being distributed to the weak pivot members. Consequently, a more reliable module is effected.

As shown in phantom in FIG. 9, arcuate surfaces 70 have embossments 76 which extend therefrom. These embossments 76 are positioned proximate the ends of surfaces 70 and act as a positioning means. In other words, when the assembly 6 is pivoted, projections 72 of assembly 6 will be caused to engage with embossments 76 of arcuate surfaces 70. This provides a frictional engagement between projections 72 and embossments 76, thereby maintaining the assembly 6 in position relative to casing 54 until a sufficient force is applied to the assembly 6 in order to overcome the frictional engagement. Once the frictional engagement is overcome, the projections 76 slidingly engage the arcuate surfaces 70.

Referring back to FIG. 4, and the first embodiment, in the closed position the edges of the cover plate 14 cooperate with recess 84 of casing 54. This cooperation insures that as downward forces are applied to the cover plate 14, i.e. someone stepping on the cover plate, the forces will be transferred to the metal shoulders of the casing 54 and then to the floor of the building. If additional support is required for the cover plate 14, the cover plate can be provided with a metal plate which would be integrally molded therein. The metal plate would provide the additional support required to insure that the cover plate 14 would not fail.

Figure 5:
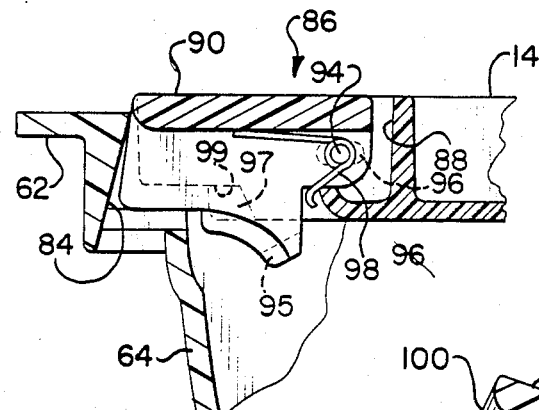
FIG. 5 is a fragmentary view of the latch associated with the module, the latch is shown in the first or closed position.
Figure 8:
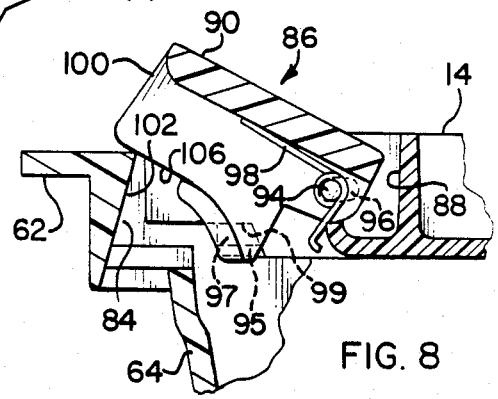
FIG. 8 is a fragmentary view similar to that of FIG. 7, the latch is provided in the open position and the cover plate is provided in the closed position.

A latch 86 is provided on the cover plate 14 at an end thereof which is opposed to the pivot member 46. As best shown in FIG. 1, latch 86 is provided in a recess 88 which is provided in the cover plate 14. Referring to FIGS. 5 through 8, latch 86 is movable between a first position and a second position. In the first position, as shown in FIG. 5, the latch 86 is closed, and in the second position, as shown in FIG. 8, the latch 86 is open.

Latch 86 has a top surface 90 and side surfaces 92 which extend from the top surface 90 in a direction which is essentially perpendicular thereto. Extending from each side surface 92 is a pivot projection 94. The axis of the pivot projections 14 extend in a plane which is essentially parallel to the plane of the top surface 90. Also extending from the side surfaces, in the same direction as pivot projections 94, are tabs 95 (as shown in FIG. 5).

As shown in FIGS. 5 through 8, pivot projections 94 are positioned in openings 96 (shown in phantom) of the cover plate 14. The openings 96 are of an elongate configuration, such that one of the dimensions of the opening 96 is significantly larger than the corresponding dimension of the respective pivot projection 94. Springs 98 are placed in engagement with the pivot projections 94, as will be more fully discussed.

In operation, latch 86 is originally provided in the first or closed position. In this position, as shown in FIG. 5, end surfaces 100 of the top surface 90 and the side surfaces 92 are placed in engagement with a holding surface 102 of the trim 52. The slight angle associated with these surfaces 100, 102 is sufficient to insure that the latch 86 can not be moved from the closed position until a force is applied thereto.

In order to move the latch 86 from the closed position, the operator must apply a force to the top surface 90 in the direction indicated by the arrow in FIG. 5. This will force the latch 86 to move away from the holding surface 102. This movement is made possible because the configuration of openings 96 allow the pivot projections 94, and the latch 86, to move relative to the cover plate 14.

Figure 6:
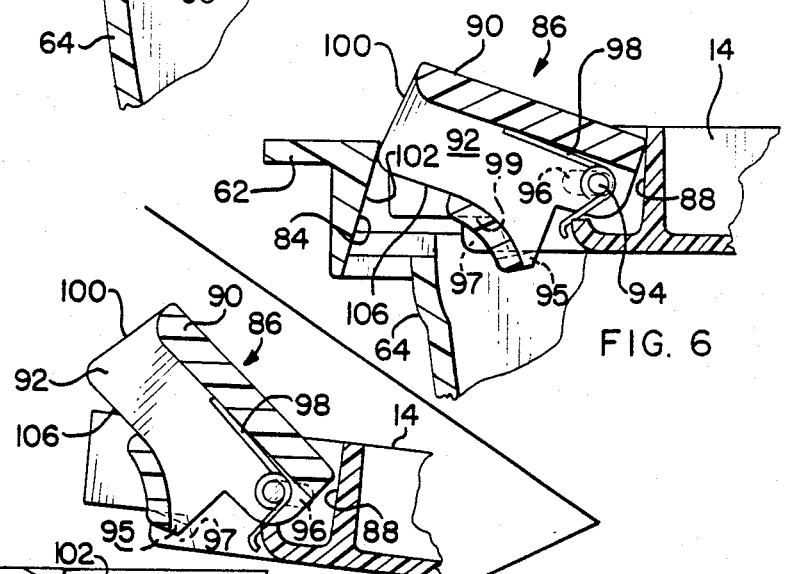
FIG. 6 is a fragmentary view similar to that of FIG. 5, the latch is position in a partially open or intermediate position.
Figure 7:
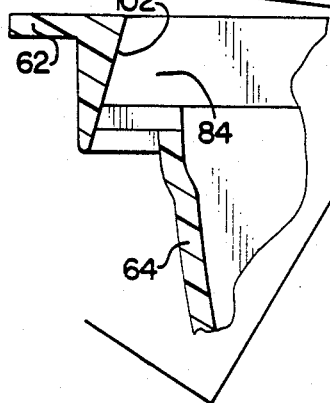
FIG. 7 is a fragmentary view similar to that of FIG. 6, the latch and cover plate are provided in an second or open position.

When the pivot projections 94 are moved to the rear of openings 96, as shown in FIG. 6, the spring 98 causes the latch 86 to pivot about pivot projections 94. This pivoting is continued until the end surfaces 100 of the side surfaces 94 engage the holding surface 102. The cooperation of the springs 98 and the surfaces 100, 102 maintains the latch 86 in this intermediate or partially opened position until a force is applied to the latch. Tabs 95 also engage the bottom surfaces of the side surfaces to help maintain the latch 86 in the intermediate position.

With the latch 86 in a partially opened position, the operator can grasp the latch 86 and apply an upward force thereto. This force is sufficient to cause the end surfaces 100 to disengage from the holding surface 102. As tabs 95 are in engagement with the side surfaces 92, the cover plate 14 is forced to move upward as latch 86 is moved upward. As the upward motion occurs, end surfaces 100 are moved beyond holding surface 102. This allows spring 98 to force the latch 86 to the open position shown in FIG. 7. In this open position, pivot projections 94 are forced to the front of openings 96. With projections 94 in the front of openings 96, tabs 95 are moved into recesses 97 provided in the side surfaces. The recesses 97 (shown in phantox in FIGS. 5 through 8) allow the tabs 95 to be moved upward, until tabs contact stop surfaces 99. With tabs 95 in engagement with the stop surfaces 99 and pivot projections 94 positioned in the front portions of openings 96, latch is provided in the open position.

With latch 86 and assembly 6 in the open position, the operator electrically connects the plugs to the electrical sockets 34, 36 located in the assembly 6. The operator then manipulates the wire of the plug into a wire receiving portion 104 of the latch 86. The cooperation of the side surfaces 92, top surface 90, holding surface 102, and wire stop surfaces 108 insure that the wire will be maintained in the wire receiving portion 104.

Once the plug has been installed, the assembly 6 is pivoted to the closed position. It is important that the wires which extend from the assembly 6 be protected from damage. Therefore, as the assembly 6 is moved to the closed position, the latch 86 must remain in the open position. As shown in FIG. 8, with the assembly 6 moved to the closed position, bottom surfaces 106 of the side surfaces 96 engage the rim 52. Also, a portion of the top surface 90 engages a portion of the cover plate 14. This insures that the latch 86 will not move as a downward force is applied thereto. Consequently, the wires which extend from the assembly will be protected.

In order to remove the wires from the latch 86, the latch is lifted, causing the assembly 6 to be pivoted toward the open position. The operator then returns the assembly 6 toward the closed position. In order for the assembly 6 to reach the closed position, the operator must exert a force, in the directions indicated by the arrows in FIG. 7, on the latch 86, to move the latch further into the recess 88. This allows the end surfaces 100 of the side surfaces 92 to move past holding surface 102. Once the cover plate 14 is properly seated on shoulders, the latch 86 is allowed to return to its original, first position, thereby insuring that the assembly 6 will be maintained in the closed position until required for operation, at which time the process is repeated.

The configuration of the access flooring module provides several important advantages. First, the flexibility of the module allows the module to be utilized with many different configurations of signal and power components. This reduces the cost associated with altering the module to conform to the ever changing needs of the office environment. A second advantage relates to the fact that a means is provided to insure for the smooth movement of the assembly between the open and closed positions. This controlled movement reduces the possibility of damaging the electrical components provided in the assembly. A third advantage is found in the operation of the latch. The movement of the latch is designed to allow for easy access to the module, while providing the means required to protect the wires which extend from the module. The isolation grounding feature is a fourth advantage of the invention.

Changes in construction will occur to those skilled in the art and various apparently different modifications and embodiments may be made without departing from the scope of the invention. The matter set forth in the foregoing description and accompanying drawings is offered by way of illustration only.

We claim:

1. A latch member for use to secure an electrical assembly in a locked position, the latch member comprising:
   frame means having openings provided therein, the openings having an oblong configuration;
   pivot means which cooperate with the openings to allow the frame means to pivot about the pivot means, the pivot means being dimensioned to allow the frame means to move relative to the pivot means in a direction which is essentially perpendicular to the longitudinal axis of the pivot means;
   resilient means provided in engagement with the frame means, the resilient means providing the means to insure that the frame means is pivoted about the pivot means;
   whereby as the frame means is moved in a direction which is essentially perpendicular to the longitudinal axis of the pivot means, the resilient means cooperates with the frame means to move the frame means between an open and a closed position.

2. A latch member as recited in claim 1 wherein the frame means has a top surface, side surfaces, and end surfaces, the openings are positioned on the side surfaces of latch member, so that the pivot means may easily inserted into the openings.

3. A latch member as recited in claim 2 wherein the latch member is provided in a recess of a cover plate of the electrical assembly, the latch member being movable between the open position and the closed position relative to the cover plate.

4. A latch member as recited in claim 3 wherein holding means are provided on a respective end surface of the latch member, the holding means cooperate with a portion of the electrical assembly to maintain the member in the closed position.

5. A latch member as recited in claim 4 wherein the holding means is an angled portion of the end surface of the latch member, the portion of the electrical assembly is also angled, such that when the holding means and the portion of the electrical assembly are provided in engagement, the latch member will be maintained in position relative to the portion of the electrical assembly.

6. A latch member as recited in claim 3 wherein the pivot means are posts which extend from the cover plate into the recess, a respective post is provided proximate each side surface of the latch member, thereby providing the support required to allow the latch member to move relative to the cover plate.

7. A latch member as recited in claim 6 wherein the resilient means are provided adjacent the pivot means, the resilient means having a spring provided at each post, the spring providing the resilient force required to move the latch member from the closed position to the open position.

8. A latch member for use to secure an electrical assembly in a locked position, the latch member comprising:
   pivot means provided to allow the latch member to pivot between a first and a second position relative to the electrical assembly;
   holding means provided proximate a portion of the electrical assembly, the holding means cooperates with the portion of the electrical assembly to maintain the latch member in the first position;
   engagement means provided to allow the latch member to be moved from the first position to an intermediate position, in which the holding means is disengaged from the portion of the electrical assembly; and spring means which cooperate with the latch member to move and maintain the latch member in the second position when the holding means is not provided in engagement with the portion of the electrical assembly.

9. A latch member as recited in claim 8 wherein a frame means is provided which has a top surface, side surfaces, and end surfaces, openings are positioned on the side surfaces of latch member, the openings cooperate with the pivot means, the engagement means provided on the top surface of the latch member.

10. A latch member as recited in claim 9 wherein the latch member is provided in a recess of a cover plate of the electrical assembly, the latch member being movable between the first position and the second position relative to the cover plate.

11. A latch member as recited in claim 10 wherein the holding means are provided on a respective end surface of the latch member.

12. A latch member as recited in claim 11 wherein the holding means is an angled portion of the end surface of the latch member, the portion of the electrical assembly is also angled, such that when the holding means and the portion of the electrical assembly are provided in engagement, the latch member will be maintained in the first position relative to the portion of the electrical assembly.

13. A latch member as recited in claim 10 wherein the pivot means are posts which extend from the cover plate into the recess, a respective post is provided proximate each side surface of the latch member, thereby providing the support required to allow the latch member to move relative to the cover plate.

14. A latch member as recited in claim 13 wherein the spring means are provided adjacent the pivot means, the spring means having a spring provided at each post, the spring providing the resilient force required to move the latch member from the first position to the second position.

15. An electrical assembly having electrical sockets provided therein, the electrical assembly comprising:
   an inner assembly having a first sidewall, a second sidewall, and endwalls;
   an outer frame means having a front wall which is spaced from the first sidewall of the inner assembly;
   pivot means provided between the inner assembly and the outer frame means, the pivot means provided to allow the inner assembly to move between a first position and a second position relative to the outer frame means;
   a deformable member provided proximate to and integrally attached to the first sidewall of the inner assembly;
   whereby as the inner assembly is moved between the first and the second positions, the deformable member will engage the front wall of the outer assembly, causing the deformable member to frictionally engage the front wall in such a manner so as to insure that the motion of the inner assembly between the first and the second position will be done in a controlled manner which will not damage the electrical sockets provided in the assembly.

16. An electrical assembly as recited in claim 15 wherein the pivot means is provided proximate the second sidewall of the inner assembly.

17. An electrical assembly as recited in claim 16 wherein the deformable member is positioned proximate and end of the first sidewall, such that as the inner assembly is moved between the first and the second positions, the deformable member will be moved accordingly, the path over which the deformable member moves will be arcuate in configuration.

18. An electrical assembly as recited in claim 17 wherein the front wall of the outer frame means has an arcuate configuration which is similar to the configuration of the path over which the deformable member will travel, such that the deformable member will be in frictional engagement with the front wall as the inner assembly is moved between the first and the second positions.

19. An electrical assembly as recited in claim 18 wherein the front wall does not engage the deformable member when the inner assembly is provided in the first position.

20. An electrical assembly as recited in claim 19 wherein the deformable member has resilient characteristics, such that when the deformable member is not provided in engagement with the front wall, the deformable member will resiliently return to its undeformed position.

21. An electrical assembly as recited in claim 18 wherein the front wall has a recess provided at one end thereof, the deformable member being provided in the recess when the inner assembly is moved to the second position, thereby providing a means to insure that the inner assembly will be maintained in the second position as required.

22. An electrical assembly having electrical sockets provided therein, the electrical assembly comprising:
   a housing assembly having a first side, a second sidewall, and endwalls;
   cover means attached to the housing assembly;
   frame means provided about the housing assembly, the frame means having a shoulder which extends there about
   pivot means provided between the housing assembly and the frame means, the pivot means provided to allow the housing assembly to move relative to the frame means between a first position and a second position;
   the cover means having an arcuate surface provided proximate the pivot means, the arcuate surface is positioned in sliding engagement with the shoulder of the frame means;
   whereby as a force is applied to the cover means, the force will be distributed to the frame means through the arcuate surface of the cover means, such that the pivot means will not have forces distributed therethrough.

23. An electrical assembly as recited in claim 22 wherein the pivot means comprise pivot projections which extend from the housing assembly and slots provided in the frame means, the slots being configured to allow the pivot projections to be inserted therein in such a manner so as to permit the pivot projections be movable in a direction which is essentially parallel to the longitudinal axis of the slot.

* * * * *